3 Sheets--Sheet 2.

S. D. CARPENTER.
Grain-Binding Harvesters.

No. 158,466. Patented Jan. 5, 1875.

Witnesses.
Harry King
Edw. W. Dow

Inventor:
S. D. Carpenter
By his Attys.
Dodge & Son

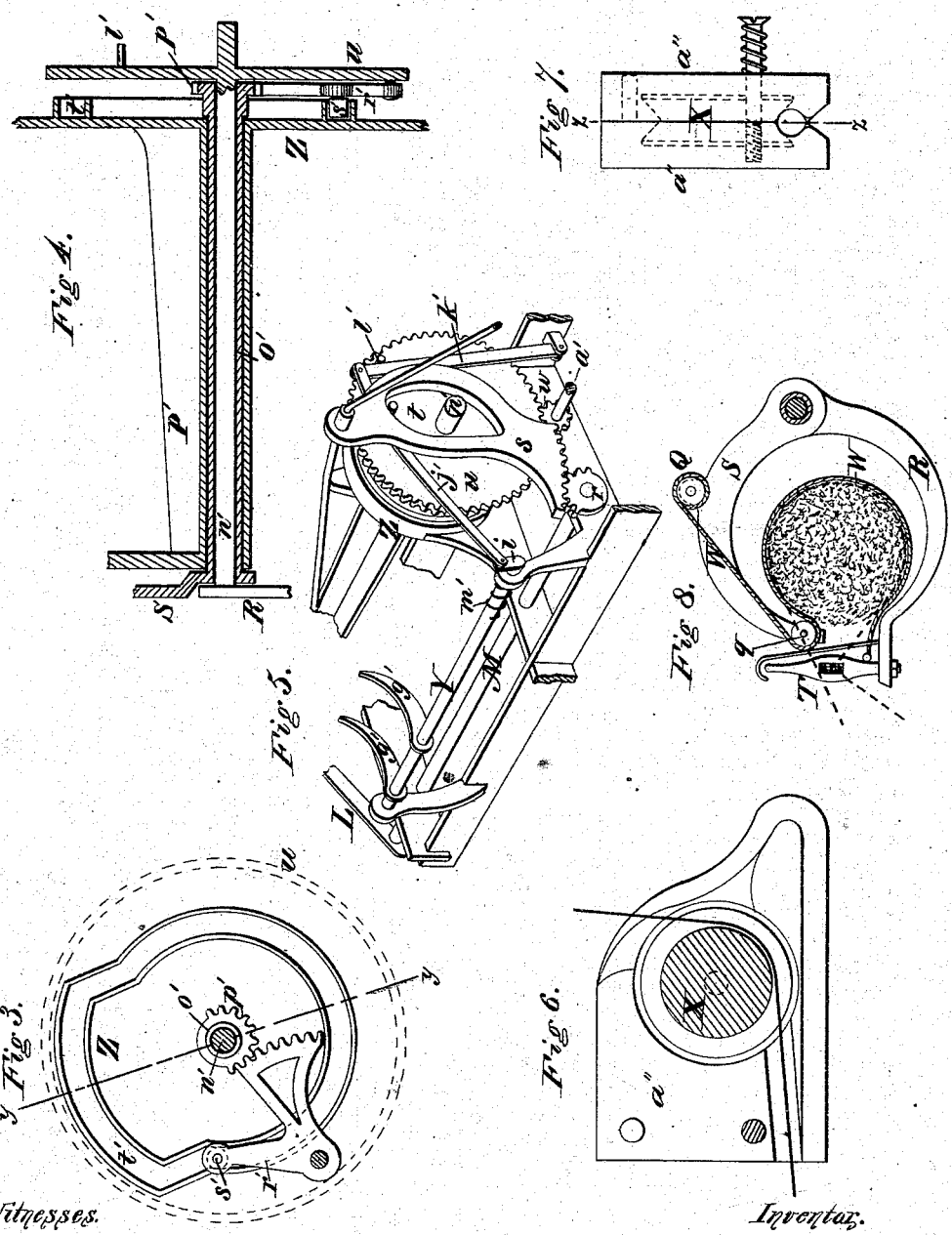

UNITED STATES PATENT OFFICE.

STEPHEN D. CARPENTER, OF MADISON, WISCONSIN.

IMPROVEMENT IN GRAIN-BINDING HARVESTERS.

Specification forming part of Letters Patent No. 158,466, dated January 5, 1875; application filed December 8, 1874.

*To all whom it may concern:*

Be it known that I, S. D. CARPENTER, of Madison, in the county of Dane and State of Wisconsin, have invented certain Improvements in Reaping and Binding Machines, of which the following is a specification:

My present invention relates to certain improvements in the grain harvesting and binding machine for which Letters Patent were granted to me bearing date the 22d day of December, 1868, and numbered 85,210; and it consists, mainly, in a novel arrangement of parts for conveying the cut grain to the binding mechanism, and in certain novelties in the binding mechanism.

In my present machine the frame, gearing, and cutting devices are substantially the same as in many other machines. I employ, however, a combined reel and rake to deliver the grain over the rear end of the main platform, a rear platform to receive the grain thus delivered, and a reciprocating rake on the rear platform to carry the grain to the binding devices on one side of the machine. The binding devices consist essentially of two revolving arms, which close together around the grain, and encircle the same with wire, and of a shuttle on one of the arms to fasten the wire. After the grain is bound the bundle is thrown from the machine automatically by tilting arms.

Figure 1:
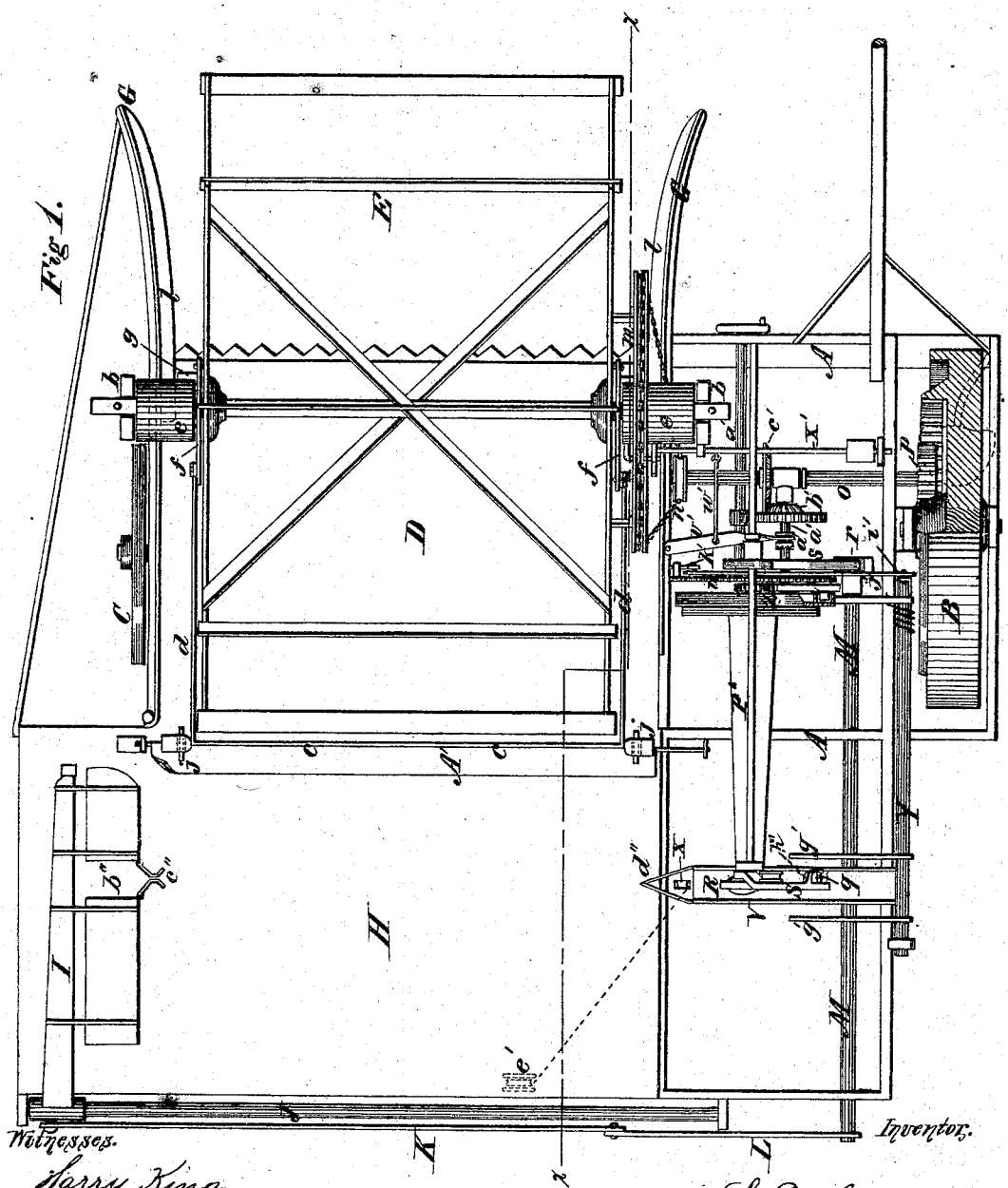
Figure 2:
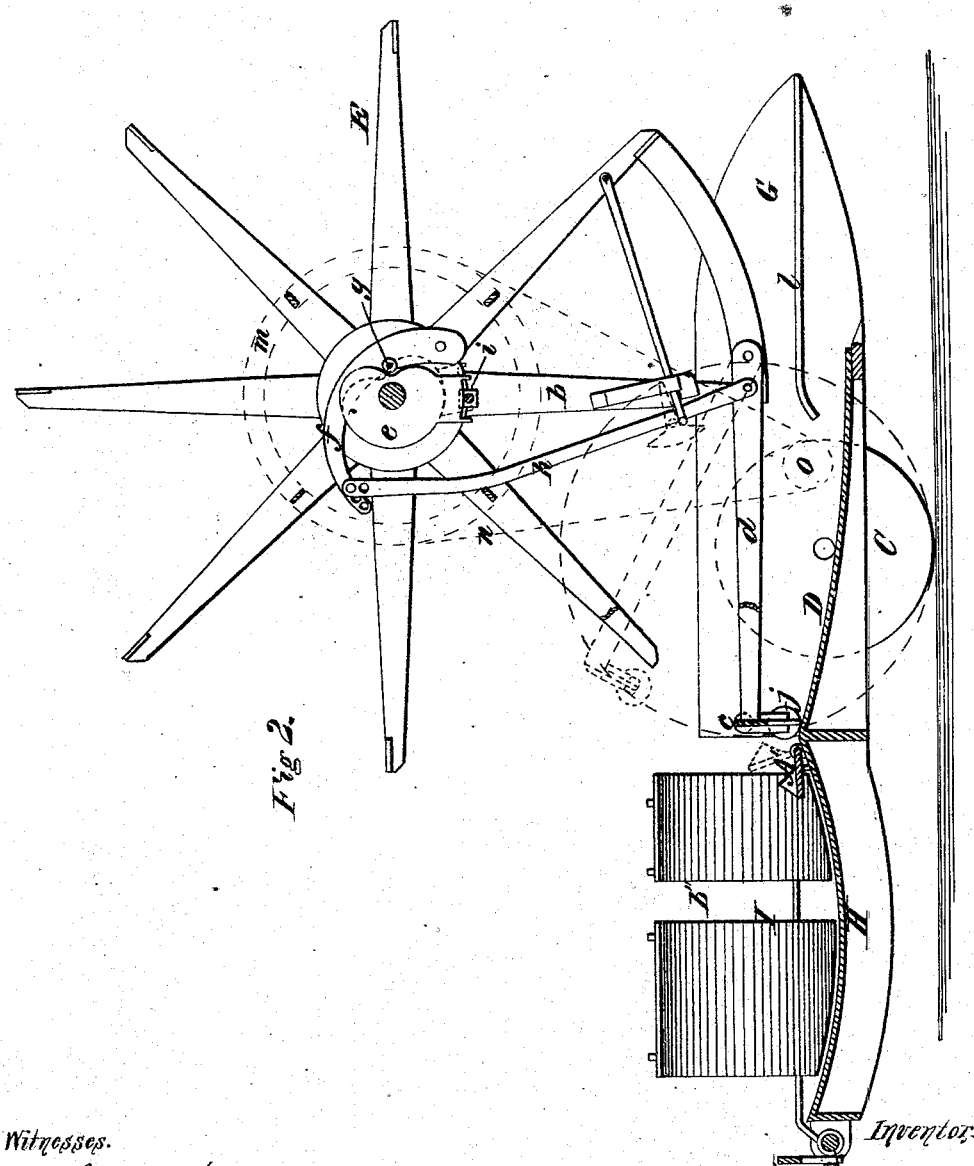

Figure 1 is a top-plan view of my improved machine; Fig. 2, a vertical longitudinal section of the same on the line *x x*; Fig. 3, a face view of the mechanism by which the two compressing or binding arms are operated; Fig. 4, a central section of the same on the line *y y*; Fig. 5, a perspective of the mechanism by which the delivering-arms, the reciprocating rake, and the binding-arms are operated; Figs. 6 and 7, respectively, a section and an edge view of the sheave or pulley and its spring-casing for guiding the binding-wire; Fig. 8, a view of the binding and compressing devices in operation.

In proceeding to construct my machine I build a rigid rectangular frame, A, and support the same by a large driving-wheel, B, on one side, and a smaller wheel, C, on the other side, as shown in Fig. 1. On the outer portion of the frame I mount the main platform D, provided at its front edge with an ordinary cutter-bar, which may be driven by means of any suitable gearing from the main or master wheel B. The grain, as it is cut, falls back upon the platform D, in the usual manner. At each side of the platform D I mount a standard, *b*, and in said standards I mount the shaft of a horizontal reel, E. This reel I construct in such manner that it also answers the purpose of a rake to sweep the cut grain off over the rear edge of the platform D. The manner in which this is done is clearly shown in Fig. 2, in which it will be seen that one of the blades or beaters *c*, instead of being attached rigidly like the others, is secured to two arms, *d*, pivoted to the ends of the reel, so that the blade can swing inward and outward from the center of the reel. During a portion of the revolution of the reel the blade *c* remains in line with the fixed blades, and serves like them to act upon the standing grain; but as it descends at the front it drops downward or outward upon the front edge of the platform D, and then slides backward upon the face thereof, so as to force the cut grain off over the rear edge, as shown in Fig. 2. The movable blade *c*, or, as it may be called, the rake, is provided with teeth of any suitable form, like any other rake. The inward or upward movement of the rake-blade is rendered positive by mounting around each end of the reel-shaft a stationary cam, *e*, and then pivoting on the end of the reel an arm, *f*, provided with a pin, *g*, bearing on the cam, and connected at its outer end by means of a rod, *h*, with the pivoted arms which carry the rake-blade, as shown in Fig. 2. As the reel revolves and carries the arm around, the pin *g* travels around the outside of the cam *e*, which, acting upon the pin, moves the arm or lever *f* so as to swing the rake-blade inward and hold it during the proper interval. The cam is so shaped that when the rake-blade reaches the rear edge of the platform D it is lifted suddenly, so as not to disturb the grain on the rear platform. In order that the movement of the rake may be varied to suit grain of different lengths, the cams *f* are slotted and secured by bolts *i* passing through said slots, as shown in Fig. 2, so that they may be turned or adjusted. For the purpose of obviating friction the ends of the rake-blade are provided with rollers $j$, which travel on the face of the platform, so as to sustain the rake-teeth above the face of the same.

In order to prevent the rake from being caught and drawn downward below the edge of the platform by such standing grain as may be tangled and broken, I provide each side of the platform with a long divider or blade, G, extending forward of the cutter-bar, and provide the inner faces of said dividers with rails or flanges $l$, as shown in Figs. 1 and 2, which serve to support and guide the rake-blade as it moves backward. The dividers G are extended a considerable distance forward of the platform, and are made very high, so that they divide the grain perfectly before the blades of the reel strike it. By extending the blades from the point up to within twelve or fifteen inches of the reel-shaft, interlocking or tangled grain will be separated and prevented from fouling on the reel-standards. This is very important when operating in tall grain, especially if the grain be inclined to the right or left by rains, winds, or other causes. The reel is made much larger than in any of the machines heretofore constructed, as I have found that the larger the reel the better the operation of the rake and the action of the reel on the standing grain. The reel may be driven by any suitable arrangement of mechanism; but I prefer the arrangement shown in Fig. 1, in which the reel is provided with a pulley, $m$, and operated by a chain, $n$, passing around another pulley on a transverse shaft, $o$, which is provided with a pinion, $p$, gearing into the driving or master wheel B. The shaft $o$ is also the source from which motion is communicated to all the other mechanism, as hereafter explained. Along the rear side of the main platform D, I mount a transverse platform, H, to receive the grain from the former. On this second platform I mount a reciprocating rake, I, which has one end mounted upon and guided by a rod, J, secured along the rear side of the platform. The purpose of this rake is, to gather the grain into a bundle and deliver it to the binding mechanism, which is located at one end of the rear platform, just behind the gearing of the machine, as shown in Fig. 1. The rake is operated by an arm, K, which is connected to the end of an arm, L, on the end of a rock-shaft, M, as shown in Figs. 1 and 5. The rock-shaft extends forward, and is provided on its front end with a pinion, $r$, which gears into a rack on the lower end of a swinging arm, $s$, as shown in Figs. 1 and 5. The arm is provided with an irregular or cam opening in its side, and is operated by a pin, $t$, which is attached to the side of a cog-wheel, $u$, and arranged to travel around within the opening in the arm, as in Fig. 5. The opening is made of such form and size that the pin acting therein moves the arm to and fro at such intervals as to give the rake I the proper movements in relation to the other parts. The cog-wheel $u$, which carries the pin, is driven by a pinion, $w$, mounted on a longitudinal shaft, $a'$, (see Fig. 5,) which is provided with a bevel-pinion, $b'$, driven by a pinion, $c'$, on the transverse shaft $o$ before mentioned, as shown in Fig. 1. The rake I is so arranged that it slides outward beyond the side of the main platform, as shown in Fig. 1, and remains stationary until the reel-rake I delivers the grain from the front platform. As soon as that occurs, the second rake advances and forces the grain to the binding mechanism, and then immediately returns to its original position at the outer end of the platform H, so as to be outside of the grain next delivered from the front platform. The binding mechanism consists essentially of two revolving curved arms, R and S, Figs. 1 and 8, which are mounted on concentric shafts, and of a shuttle T, attached to the end of the arm R, as shown in Fig. 8. The arms are so arranged that as the grain is brought forward by the reciprocating rake I, they close together around it, so as to compress it into a bundle, and hold it in that form. When the arms thus close together, the shuttle carries the free end of the wire around the grain and back to the body of the wire, which passes through a pulley, $q$, on the end of the other arm, S, as shown in dotted lines in Fig. 8. As soon as the arms have closed together, so as to compress the grain and encircle it with the wire, they both turn or revolve outward without separating or releasing the grain. Under the binding-arms I secure to the frame a curved rack-bar, V, as shown in Fig. 1, which, as the arms turn outward, acts upon the twister in the shuttle, so as to cause the latter to fasten and sever the wire. The construction and operation of the shuttle and rack are fully described in application filed by me February, 1873, to which reference is made for fuller details. The rack, however, instead of being mounted above the binding-arm, as in my previous patent, is located below the arm on the frame. In order to compress the grain to a greater degree than is accomplished by simply closing the arms, I provide a belt, W, and secure one of its ends to the arm R near the shuttle, and pass it around a pulley, $q$, on the end of arm S and attach its other end to a spring-drum or take-up, Q, on said arm S, as shown in Fig. 8, so that as the arms close together, the belt is drawn tightly around the grain. The binding-wire is wound upon a friction-spool, $e'$, located under the rear platform, as shown in Fig. 1, and passes thence upward over a pulley, X, at the inner end of said platform, in line with the shuttle-arm, and thence around the pulley $q$ on the end of arm S, and into the shuttle on arm R. When the arms are opened the wire is drawn across from the end of one to the end of the other, and then, when the arms close together, they carry the wire around the grain, as before mentioned.

When the shuttle severs the wire, to release the bundle of grain, it retains the end, so that when the arms again separate the wire is stretched between them to receive the next bundle, and so on repeatedly.

In order to prevent the binding-wire from jumping off from the pulley $q$ on the end of the compressing-arm S I pass a strap or guard, $h''$, over the pulley, as shown in Fig. 1. It will be noticed that this pulley is made double width, and that the binding-wire and the compressing-band both pass over it. The end of the pulley next the arm S is tapered down, as in Fig. 1, so as to throw the wire over close to the arm, in order that the shuttle may be certain to take hold of it when the arms close together.

When the binding of the bundle is completed and the wire severed, the arms separate, so as to release the bundle. This occurs at a time when the arms are turned back over the outside of the frame.

In order to throw the bundle clear of the machine there is mounted on the rear of the frame a rock-shaft, Y, provided with arms $g'$. These arms receive the bundle from the binding apparatus, and then, when the shaft is turned, they throw the bundle from the machine.

The shaft is provided, at its forward end, with a crank, $i'$, which is connected, by a rod, $j'$, to the upper end of a vertical arm, $k'$, which is pivoted to the frame, and operated by a pin, $l'$, on the cog-wheel $u$, as shown in Fig. 5. When the pin moves the lever it in turn moves the rod $j'$, which operates the crank $i'$, and turns the rock-shaft Y, so as to operate the delivering-arms $g'$. As the pin $l'$ releases the arm $k'$ the delivering-arms are thrown back in position to receive the next bundle of grain by a spring, $m'$, mounted on their shaft Y, as shown in Fig. 5.

The manner in which the required movements are given to the binding or compressing arms will now be noticed.

It was before mentioned that the arms were mounted upon concentric shafts, and upon referring to Figs. 3 and 4 the arrangement of these shafts one within the other will be readily seen.

The arm R, which carries the shuttle, is secured to the end of a shaft, $n'$, which is mounted within a hollow shaft, $o'$, which carries the other arm, S. Both shafts are supported in an arm, P', extending rearward from one side of a rigid upright, Z, which is secured upon the frame, as shown in Figs. 1 and 5. The inner shaft, $n'$, which carries the arm having the shuttle, is operated by the cog-wheel $u$, secured on its forward end, as shown in Figs. 4 and 5. This is, it will be noticed, the wheel which has been heretofore mentioned as being provided with the pins to operate, indirectly, the reciprocating rake and the delivering-arms. This wheel also serves, by means of intermediate devices, to operate the outer or hollow shaft, $o'$, which carries the other binding-arm, S. The arrangement by which this is accomplished is shown in Figs. 3 and 4, in which it will be seen that the hollow shaft is provided with a pinion, $p'$, which gears into a rack formed on one arm of an elbow-lever, $r'$, which latter is pivoted to the wheel $u$, and provided on its other arm with a wrist or pin, $s'$, which travels in a cam-groove, $t'$, formed in the side of the rigid upright Z.

When the wheel $u$ is set in motion to turn the shuttle-arm R it carries the elbow-lever $r'$ around, so as to slide the pin $s'$ around in the cam-groove $t'$, which is so shaped that it turns the elbow-lever at certain times, and thereby causes the lever to turn the pinion $p'$ and its shaft $o'$, and change the position of its binding-arm S in relation to the other or shuttle arm, R.

The groove may be said to consist of two portions, both concentric with the shaft, but at different distances therefrom, as shown in Fig. 3.

It is obvious that, while the pin of the elbow-lever is sliding around in either portion of the groove, it is held fast and immovable on its pivot, so that it locks the two binding-arms in a certain relative position to each other, and causes them to so remain while they are both revolving together. While the pin is sliding in the inner portion of the groove it holds the binding-arms apart, and while sliding in the outer portion of the same it holds them together around the grain. The only movement of the lever is when its pin or wrist slides in or out from one portion of the groove to the other, at which times the arms are caused to open and close.

In view of the above arrangement it will be readily understood how it is that the two arms are caused to embrace the grain, and then to swing outward with it, and finally to open and drop it on the delivering-arms, as before described.

In order to stop and start the wheel $u$ and its attendant mechanism automatically at the proper intervals the pinion $w$, which drives it, is mounted loosely on its shaft $a'$, and operated by a clutch, $u'$, Fig. 1, so that it may be thrown in and out of gear.

The clutch is moved by a lever, $v'$, which is connected, by a rod, $w'$, to an arm on a rock-shaft, $x'$, which latter is provided on one end with an arm, which is struck and operated by a projection on the reel E, as shown in Fig. 1. The projection, striking the arm of the rock-shaft, turns the shaft, and causes its arm to operate the rod $w'$ and lever $v'$, and thereby the clutch.

It was before mentioned that the binding-wire passes over a guiding-pulley, X, in the bottom of the frame. As the wire is liable to run off the pulley and to break, I surround the pulley with a guard or casing, $a''$, as shown in Figs. 6 and 7. The casing is divided into two halves, one of which is secured to the other by long bolts provided with spiral springs, as shown in Fig. 7, so that the casing can be readily drawn apart in order to allow the wire to be passed in around the pulley. The inner adjoining edges of the two parts are generally beveled, as shown, so that the wire can be drawn between them without separating them by hand. The casing thus constructed serves both as a guard to prevent the wire from running off and as an assistance in placing the wire on again.

In connection with the reciprocating rake already described, there are two further points to be noticed. The first is a board or blade, A', hinged to the rear edge of the main platform D, and curled up at its rear corner, as shown in Figs. 1 and 2, so that when the reciprocating rake advances its end will turn the plate up in a vertical position, so as to prevent the rake from disturbing such grain as may happen to project over the rear edge of the main platform D. When the rake recedes its end passes from under the blade, which then turns down, so that the grain can pass over it from the front platform. The other point is that the face or body of the reciprocating rake I is set forward of the main bar or arm, and provided with an opening, $b''$, to admit the binding-arms R and S when the rake is carried forward. This arrangement admits of the grain being carried well forward into the binding-arms and of the shuttle passing freely around the grain.

In order to prevent the grain from being forced out into the opening $b''$, so as to foul the shuttle, two wings or plates, $c''$, are hinged to opposite sides of the opening, and so arranged as to close together, as shown in Fig. 1. When the rake I advances and delivers the grain to the binding-arms the wings $c''$ are shoved apart by a point, $d''$, on the end of the curved rack V, which point is shown in Fig. 1. The wings are provided with springs or other devices for closing them together again when the rake moves back again to receive another gavel.

It will of course be understood that in constructing the machine the various parts are constructed and arranged to operate at the proper speed, and to stop and start at the proper intervals, so as to act in harmony and unison. The reel-rake is so arranged that it gathers sufficient grain to form a sheaf or bundle at each stroke.

Having thus described my invention, what I claim is—

1. The rake $c^*$, attached to the reel by pivoted arms, and provided with the projections for supporting it on the ways $l$, and rollers for supporting it on the platform, in combination with the actuating-cams $e$, all constructed and arranged to operate as and for the purpose set forth.

2. The cams $e$, arranged to be adjusted as set forth, whereby the movement of the rake $c$ can be regulated, as described.

3. The rock-shaft Y, provided with the arms $g'$, arranged in relation to the binder in such a manner that said arms shall rest under the bundle while being bound, said shaft Y having attached the pivoted rods, arranged to be operated by the pin $l$ of wheel $u$, substantially as described, whereby, when the bundle is bound, the arms $g'$ are caused to remove it from the machine, as set forth.

4. In combination with the reel E and rake $c$, the cams $e$, levers $f$, and rods $h$, arranged to operate the rake, as set forth.

5. The platforms D and H, in combination with the reciprocating rake I and hinged cut-off A', arranged to operate substantially as and for the purpose set forth.

6. The swinging arm $s$, constructed and operated substantially as described, in combination with the rock-shaft M, provided with the pinion $r$, for imparting an intermittent reciprocating motion to the rake I, as set forth.

7. The wheel $u$, secured upon the shaft $n'$, and carrying the elbow-lever $r'$, in combination with the cam $t'$ and the shaft $o'$, with its pinion $p'$, arranged to operate as described, for imparting motion to the compressing or binding arms, as set forth.

8. The sheave or pulley X, inclosed within the spring-case $a''$, for guiding the binding-wire of a reaping and binding mechanism.

STEPHEN D. CARPENTER.

Witnesses:
F. E. DIETRICH,
F. H. STOLTZE.